United States Patent Office 3,634,358
Patented Jan. 11, 1972

3,634,358
PREPARATION OF POLYESTER RESINS USING MANGANESE BORATE CATALYSTS
Yuzi Okuzumi, Akron, Ohio, assignor to The Goodyear Tire & Rubber Company, Akron, Ohio
No Drawing. Filed Aug. 21, 1969, Ser. No. 852,070
Int. Cl. C07c 67/02; C08g 17/013
U.S. Cl. 260—75 R          8 Claims

ABSTRACT OF THE DISCLOSURE

Highly polymeric linear condensation polyesters are prepared by ester interchange reactions of bis glycol esters of dicarboxylic acids with glycols in the presence of a catalytic amount of a compound selected from the group consisting of manganese orthoborate, manganese metaborate and manganese pyroborate followed by condensation polymerization in the presence of an auxiliary catalyst.

This invention relates to the preparation of glycol esters of dicarboxylic acids. More particularly this invention relates to an improvement in the method of preparing such esters by the alcoholysis or ester interchange reaction between glycols and bis esters of dicarboxylic acids.

The glycol esters of terephthalic acid, for example, when polymerized to high molecular weight polyesters provide materials that can be processed into extruded goods and molded articles having excellent properties. One of the most satisfactory methods for the preparation of these polyesters, particularly from the standpoint of simplicity of reaction and economy of operation, has been the ester interchange method in which the esters of these acids are reacted with a glycol to form the diglycol ester of the acid, which is then polymerized to a high molecular weight polymeric polyester by a condensation reaction, with the splitting off of the glycol. This method has not been entirely satisfactory because the initial ester interchange reaction is slow and because many of the materials which catalyze the initial reaction accelerate the decomposition and discoloration of high molecular weight polyesters and promote the formation of undesirable by-products. To prevent color formation, metal compounds such as magnesium or calcium have been used as catalysts. However, these often form insoluble precipitates in the polyester, giving an undesirable effect in the resultant fibers, films, etc. Zinc acetate has been used in the past for the ester interchange catalyst, but this leads to undesirable side reactions containing ether linkages. These ether linkages are thermally less stable, thus tending to cause degradation while the polyester is maintained in the molten condition during the melt spinning operation.

Thus, according to this invention, highly polymeric linear polyesters are prepared by subjecting a bis ester of a dicarboxylic acid to alcoholysis in an excess of a glycol with attendant splitting off of the alcohol corresponding to said esters in the presence of a catalytic amount of a compound selected from the group consisting of manganese orthoborate, manganese metaborate and manganese pyroborate and afterward carrying out the condensation reaction with the removal of glycol under condensation conditions.

The invention thus provides an improved process for preparing, by ester interchange, highly polymeric linear polyesters by heating esters of said acids, such as dimethyl terephthalate, with a glycol, such as ethylene glycol, in the presence of a catalytic amount of a compound selected from the group consisting of manganese orthoborate, manganese metaborate and manganese pyroborate, with attendant splitting off of the alcohols corresponding to said esters and the subsequent glycol condensation polymerization reaction.

The following examples, in which percentages and parts referred to are by weight, illustrate this invention.

EXAMPLE 1

Fifty parts of dimethyl terephthalate and 40 parts of ethylene glycol were mixed in the presence of 0.02 part of manganese borate in a glass reaction tube approximately 35 centimeters long having an inside diameter of 38 millimeters, equipped with a side arm, a nitrogen gas inlet tube and stirrer. Nitrogen gas was slowly passed into the reaction tube and over the mixture. The mixture was stirred and heated by means of a vapor bath which surrounded the tube and having a temperature of 240° C. The time required to collect the theoretical amount of methanol released from the dimethyl terephthalate in the ester exchange reaction was 65 minutes.

Then 0.015 part of antimony oxide was added to the reaction mixture and polymerization was continued at 280° C. and a pressure of 0.5 millimeter of mercury for two hours. The polyester obtained was colorless and possessed an intrinsic viscosity of 0.78.

EXAMPLE 2

The same procedure as in Example I was followed except that 0.035 weight percent manganese borate based on the dimethyl terephthalate was used as ester interchange catalyst and 0.03 percent antimony oxide based on dimethyl terephthalate and 0.04 percent of triphenyl phosphite were added later. The ester interchange was complete after 65 minutes and after the polycondensation reaction the final polymer was colorless and possessed an intrinsic viscosity of 0.801. This is illustrated below in Table I.

EXAMPLE 3

The same procedure was followed as in Example 1 except that 0.015 part zinc acetate was used as an ester interchange catalyst. The ester exchange reaction was completed in 70 minutes. The final polymer obtained after the condensation reaction was slightly yellow and possessed an intrinsic viscosity of 0.608. The data are summarized in Table I.

TABLE I

| | Carboxyl content | Intrinsic viscosity | Melting point, ° C. | Percent BB[1] thermal stability | Percent BB[1] hydrolytic stability | Color |
|---|---|---|---|---|---|---|
| Example: | | | | | | |
| 1 | 19 | .780 | 264 | .07 | .09 | Colorless. |
| 2 | 16 | .801 | 265 | .055 | .076 | Do. |
| 3 | 22 | .608 | 262 | .102 | .128 | Slightly yellow. |

[1] Broken bonds.

The intrinsic viscosity is defined as limit $\ln(\eta)_r/C$ as C approaches zero in which $\eta_r$ is the viscosity of a dilute solution of the resin in a 60/40 phenol/tetrachloroethane solvent mixture divided by the viscosity of the solvent mixture in the same units at the same temperature. For the intrinsic viscosities reported in this specification a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscosimeter at 30.0° C. and these times were used in the respective viscosities in the equation above.

In the practice of this invention the preparation of glycol esters is in general carried out in accordance with the usual known techniques. Thus the reaction is preferably carried out in the absence of oxygen, generally in an atmosphere of an inert gas such as nitrogen in order to lessen darkening and to make it possible to attain a high molecular weight pale or colorless polyester product from the glycol ester. Thus the ester interchange reaction is conducted at temperatures of 230° to 280° C. under a nitrogen atmosphere and atmospheric pressure. The subsequent condensation polymerization is carried out at 240° and 280° C. under reduced pressure of 0.01 to 0.5 millimeter of mercury pressure.

The amount of manganese borate used may be varied over wide concentrations. As usual with catalysts the amount will ordinarily be very small. As a general rule the amount will be within the range of from 0.001 to 0.100 weight percent based on the bis ester of dicarboxylic acid used in the reaction. The preferred range is 0.005 to 0.050 percent based on the dicarboxylic acid bis ester to give a satisfactory reduction reaction rate and a product of suitable color. The auxiliary catalyst used in combination with the catalysts of this invention will ordinarily be small. Usually the amount will be in the range of from 0.001 to 0.05 percent (calculated as metal) based on the dicarboxylic acid ester used.

The catalysts of this invention can be used as the sole ester interchange catalyst. However, as shown above, it is advantageous to use it in combination with other catalysts, especially in the condensation reaction. Thus better results are obtained by using an auxiliary catalyst in combination with the catalysts of this invention during the condensation reaction. Antimony compounds are particularly effective condensation catalysts and act conjointly with the ester interchange catalyst present to promote the condensation of the glycol esters formed in the alcoholysis reaction to form high molecular weight polymers in shortened reaction periods. Various antimony compounds can be used, such as antimony acetate, antimony trioxide, antimony glycolate and other glycol soluble antimony compounds.

The auxiliary condensation catalyst can be added to the reactants along with the ester interchange catalysts at the beginning of the alcoholysis reaction, or, if desired, can be added to the glycol esters formed by such reaction prior to the start of the condensation reaction.

The carboxyl content of each of the samples of resins was found by determining the acid number using standard procedure and expressing the acid number as the number of equivalents of free carboxyl groups per $10^6$ grams of polymer.

Thermal stability of each of the samples was determined as follows: A sample of the resin was ground to pass a 20 mesh screen and dried for 16 hours at 135° C. and 1 millimeter of mercury pressure. The dried samples were placed in a Petri dish and aged at 280° C. in an electrically heated oven in the presence of air for one day. Intrinsic viscosity of the sample was then determined. The decrease in intrinsic viscosity on aging in this manner expressed as percent broken bonds gives a measure of the thermal stability of the resin.

The equation used for calculating the percent broken bonds (BB) is:

$$\text{Percent } BB = \frac{[N]_o - [N]_a}{[N]_o \times [N]_a} X K X 100$$

wherein

K = a variable relationship dependent on the molecular weight-intrinsic viscosity relationship,
$[N]_o$ = intrinsic viscosity of the initial sample,
$[N]_a$ = intrinsic viscosity of the aged sample.

Intrinsic viscosity of each of the samples was determined in a 60/40 phenol/tetrachloroethane mixed solvent at 30.0° C.

Hydrolytic stability of each of the samples was determined as follows: A sample of the resin was cut into particles having a diameter of about two millimeters. About one gram of these particles was heated at 140° C. at one millimeter of mercury pressure for 16 hours. This sample was then transferred to a 400 milliliter stainless steel beaker containing 20 milliliters of distilled water. The beaker was placed in a steam sterilizer and heated at 120° C. for six hours. The polymer was recovered from the water by filtration, rinsed with acetone and dried for three hours at 60° C. at atmospheric pressure and then for 16 hours at 140° C. and one millimeter of mercury pressure. The intrinsic viscosity of the thus treated polymer was determined in a 60/40 phenol/tetrachloroethane mixed solvent at 30.0° C.

The percent broken linkages due to the hydrolysis treatment was calculated for each sample of sample of resin using the following formula:

$$\text{Percent } BB = \frac{[N]_o - [N]_h}{[N]_o \times [N]_h} X C X 100$$

in which $[N]_o$ is the intrinsic viscosity of the original polymer,
$[N]_h$ is the intrinsic viscosity of the hydrolyzed polymer, and
C is a variable relationship dependent on the molecular weight-intrinsic viscosity relationship.

The examples illustrate the invention using the dimethyl esters of terephthalic acid and ethylene glycol. The invention is effective with other esters, such as the ethyl, propyl, butyl and phenyl esters of the phthalic acids and of other aromatic and aliphatic acids. Thus the catalyst combination can be used in the preparation of polyesters derived from other acids and/or other glycols. Representative examples of such other acids are aliphatic acids of the formula

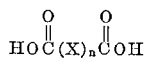

where X is an alkylene group and $n$ is zero to ten, such as oxalic acid, malonic acid, succinic acid, glutaric acid, adipic acid, sebacic, acid, suberic acid, etc.; methyl succinic acid, α-methyl adipic acid; aromatic acids, such as the phthalic acids, the naphthalene dicarboxylic acids, the diphenyl dicarboxylic acids; and araliphatic acids such as α,β-diphenyl ethane-4,4-dicarboxylic acid, α,β-diphenyl butane-4,4'-dicarboxylic acid. Representative examples of other glycols that can be used are trimethylene glycol, tetramethylene glycol, pentamethylene glycol, hexamethylene glycol, decamethylene glycol, alkyl-substituted polymethylene glycols such as 2,2-dimethyl-1,3-propane diol, 2,2-diethyl-1,3-propane diol, diethylene glycol, 2,2-bis[4-(β-hydroxyethoxy)phenyl]propane and cyclohexane dimethanol. The phthalic acids and ethylene glycol are preferred because of their low cost and ready availability.

Representative examples of manganese borates are manganese orthoborate, manganese pyroborate and manganese metaborate.

While certain representative embodiments and details have been shown for the purpose of illustrating the invention it will be apparent to those skilled in this art that

What I claim is:

1. In the process for preparing highly polymeric linear polyester resins by subjecting a bis ester of a dicarboxylic acid selected from the group consisting of methyl, ethyl, propyl, butyl and phenyl esters to alcoholysis in the presence of an excess of a glycol with attendant splitting off of the alcohols corresponding to said esters and then subjecting the glycol esters formed to condensation polymerization the improvement which comprises carrying out the alcoholysis step of the process in the presence of a catalytic amount of an ester interchange catalyst selected from the group consisting of manganese orthoborate and manganese metaborate.

2. A process according to claim 1 in which the catalytic amount is from 0.001 to 0.100 weight percent based on the dicarboxylic acid used in the reaction mixture.

3. The process of claim 1 wherein the glycol is ethylene glycol.

4. The process of claim 1 wherein the bis ester of a dicarboxylic acid is dimethyl terephthalate.

5. In a process for preparing highly polymeric linear polyester resin by subjecting a bis ester of a dicarboxylic acid selected from the group consisting of methyl, ethyl, propyl, butyl and phenyl esters to alcoholysis in the presence of an excess of a glycol and thereafter subjecting the glycol esters formed to condensation polymerization, the improvement which comprises conducting both the alcoholysis and the condensation in the presence of a catalytic amount of an ester interchange catalyst selected from the group consisting of manganese orthoborate and manganese metaborate.

6. The process of claim 5 wherein the bis ester of a dicarboxylic acid is dimethyl terephthalate.

7. The process of claim 5 wherein the catalytic amount is from 0.001 to 0.100 weight percent based on the dicarboxylic acid used in the reaction mixture.

8. The process of claim 5 wherein the glycol is ethylene glycol.

References Cited

UNITED STATES PATENTS 3,522,216   7/1970   Price et al. _____ 260—75

FOREIGN PATENTS 1,492,938   7/1967   France _____ 260—47 C
1,136,148   12/1968  Great Britain _____ 260—75 N

OTHER REFERENCES

P. 777, Bennett Concise Chemical and Technical Dictionary, published 1947 Chemical Publishing Co., Inc., Brooklyn, N.Y.

WILLIAM H. SHORT, Primary Examiner

L. P. QUAST, Assistant Examiner

U.S. Cl. X.R.

260—47 C, 475 P, 485 G